US011360877B2

(12) United States Patent
Lin et al.

(10) Patent No.: US 11,360,877 B2
(45) Date of Patent: Jun. 14, 2022

(54) FORMING MICROSERVICES FROM MONOLITHIC APPLICATIONS

(71) Applicant: International Business Machines Corporation, Armonk, NY (US)

(72) Inventors: Chen Lin, Elmsford, NY (US); Anup Kalia, White Plains, NY (US); Jin Xiao, White Plains, NY (US); John Rofrano, Mahopac, NY (US); Saurabh Sinha, Danbury, CT (US); Raghav Batta, Ossining, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/019,480

(22) Filed: Sep. 14, 2020

(65) Prior Publication Data

US 2022/0083451 A1 Mar. 17, 2022

(51) Int. Cl.
*G06F 11/36* (2006.01)
*G06F 16/28* (2019.01)
*G06F 9/22* (2006.01)

(52) U.S. Cl.
CPC .......... *G06F 11/3636* (2013.01); *G06F 9/223* (2013.01); *G06F 11/3688* (2013.01); *G06F 11/3692* (2013.01); *G06F 16/285* (2019.01)

(58) Field of Classification Search
CPC ............. G06F 11/3636; G06F 11/3688; G06F 11/3692; G06F 16/285; G06F 9/223
USPC .................................. 717/127–140, 154–157
See application file for complete search history.

(56) References Cited

U.S. PATENT DOCUMENTS

| | | | | |
|---|---|---|---|---|
| 6,038,281 A * | 3/2000 | Mazess | ..... | A61F 2/468 378/54 |
| 6,823,269 B2 * | 11/2004 | Junker | ..... | G01N 27/9073 324/220 |
| 7,003,507 B2 * | 2/2006 | Tip | ..... | G06F 9/449 |
| 7,309,494 B2 * | 12/2007 | Corvaia | ..... | A61K 39/155 424/211.1 |
| 7,788,656 B2 * | 8/2010 | Harper | ..... | G06T 1/20 345/631 |
| 8,930,916 B1 * | 1/2015 | Soeder | ..... | G06F 8/53 717/133 |

(Continued)

OTHER PUBLICATIONS

Kecskemeti et al, "The ENTICE Approach to Decompose Monolithic Services into Microservices", IEEE, pp. 591-596 (Year: 2016).*

(Continued)

*Primary Examiner* — Anil Khatri
(74) *Attorney, Agent, or Firm* — Timothy J. Singleton (57) ABSTRACT

A method, system, and computer program product for decomposing monolithic applications to form microservices are provided. The method identifies a set of classes within a monolithic application. A set of horizontal clusters are generated by performing horizontal clustering to the set of classes to decompose the classes based on a first functionality type. The method generates a set of vertical clusters by performing vertical clustering to the set of classes to decompose the classes based on a second functionality type. A subset of classes occurring in a common horizontal cluster and vertical cluster are identified as a functional unit. The method merges one or more functional units to form a microservice.

17 Claims, 7 Drawing Sheets

(56) References Cited

U.S. PATENT DOCUMENTS

| | | | | |
|---|---|---|---|---|
| 8,997,058 | B2* | 3/2015 | Bohnet | G06F 11/3644 |
| | | | | 717/158 |
| 9,652,214 | B1* | 5/2017 | Eberlein | G06F 9/44526 |
| 10,073,759 | B2* | 9/2018 | Cook | G06F 11/3632 |
| 10,127,139 | B2* | 11/2018 | O'Dowd | G06F 16/345 |
| 10,353,701 | B2* | 7/2019 | Atanasiu | G06F 8/75 |
| 10,430,250 | B2* | 10/2019 | Ishikawa | G06F 8/76 |
| 10,540,259 | B1* | 1/2020 | Kramer | G06F 11/3409 |
| 10,579,370 | B2* | 3/2020 | Gupta | G06F 8/20 |
| 10,606,573 | B2 | 3/2020 | Apte et al. | |
| 10,620,947 | B2* | 4/2020 | Gavisiddappa Kodigenahalli | |
| | | | | G06F 8/76 |
| 10,628,152 | B2 | 4/2020 | Chandramouli et al. | |
| 10,637,952 | B1* | 4/2020 | Koenig | H04L 67/1031 |
| 10,713,664 | B1* | 7/2020 | Alagappan | G06F 40/205 |
| 10,970,067 | B1* | 4/2021 | Gupta | G06F 9/546 |
| 11,068,328 | B1* | 7/2021 | Rafey | G06F 11/3466 |
| 11,093,216 | B2* | 8/2021 | Sasidharan | G06F 8/30 |
| 2019/0205106 | A1 | 7/2019 | Sharma et al. | |
| 2019/0212992 | A1 | 7/2019 | Jonnadula et al. | |
| 2019/0334789 | A1 | 10/2019 | Roche et al. | |

OTHER PUBLICATIONS

Eski et al, "An Automatic Extraction Approach—Transition to Microservices Architecture from Monolithic Application", ACM, pp. 1-6 (Year: 2018).*

Chen et al, "From Monolith to Microservices: A Dataflow-Driven Approach", IEEE, pp. 466-475 (Year: 2017).*

Kamimura et al, "Extracting Candidates of Microservices from Monolithic Application Code", IEEE, pp. 571-580 (Year: 2018).*

Extracting Microservices Candidates from Monolithic Applications: Interface Analysis and Evaluation Metrics Approach, IEEE, pp. 000289-000294 (Year: 2020).*

Brito et al, "Identification of Microservices from Monolithic Applications through Topic Modelling", ACM, pp. 1409-1418 (Year: 2021).*

Mazlami et al, "Extraction of Microservices from Monolithic Software Architectures", IEEE, pp. 524-531 (Year: 2017).*

Kazanavicius et al., "Migrating Legacy Software to Microservices Architecture," 2019 Open Conference of Electrical, Electronic and Information Sciences (eStream), Vilnius, Lithuania, 2019, 5 pages.

Lauretis, "From Monolithic Architecture to Microservices Architecture," 2019 IEEE International Symposium on Software Reliability Engineering Workshops (ISSREW), Berlin, Germany, 2019, 4 pages.

Zhao et al., "An orthogonal approach to reusable component discovery in cloud migration" China Communications, May 2015, Strategies and Schemes, 18 pages.

Mell et al., "The NIST Definition of Cloud Computing", Recommendations of the National Institute of Standards and Technology, Special Publication 800-145, Sep. 2011, 7 pages.

* cited by examiner

FORMING MICROSERVICES FROM MONOLITHIC APPLICATIONS

BACKGROUND

Microservices are an architectural style of structuring an application as a collection of services. These collections of services may be maintainable and testable, loosely coupled, and independently deployable. Collections of services may be organized around common capabilities. A monolithic application is an architectural style for single-tiered software applications. Monolithic applications are often self-contained and independent from other computing applications. Monolithic applications often lack modularity. Monolithic applications are a single unified unit, while microservices break down similar functionality into smaller units which may operate independently. Each process of an application using a microservice architecture acts as a separate service, while monolithic applications are often deployed on identical servers and use load balancing to offer simplified deployment and horizontal scaling. Microservices enable individual development of services, reduce barriers to adopting or adapting new technologies, and allow for independent scaling of services.

SUMMARY

According to an embodiment described herein, a computer-implemented method for decomposing monolithic applications to form microservices is provided. The method identifies a set of classes within a monolithic application. A set of horizontal clusters are generated by performing horizontal clustering to the set of classes to decompose the classes based on a first functionality type. The method generates a set of vertical clusters by performing vertical clustering to the set of classes to decompose the classes based on a second functionality type. A subset of classes occurring in a common horizontal cluster and vertical cluster are identified as a functional unit. The method merges one or more functional units to form a microservice.

According to an embodiment described herein, a system for decomposing monolithic applications to form microservices is provided. The system includes one or more processors and a computer-readable storage medium, coupled to the one or more processors, storing program instructions that, when executed by the one or more processors, cause the one or more processors to perform operations. The operations identify a set of classes within a monolithic application. A set of horizontal clusters are generated by performing horizontal clustering to the set of classes to decompose the classes based on a first functionality type. The operations generate a set of vertical clusters by performing vertical clustering to the set of classes to decompose the classes based on a second functionality type. A subset of classes occurring in a common horizontal cluster and vertical cluster are identified as a functional unit. The operations merge one or more functional units to form a microservice.

According to an embodiment described herein, a computer program product for decomposing monolithic applications to form microservices is provided. The computer program product includes a computer-readable storage medium having program instructions embodied therewith, the program instructions being executable by one or more processors to cause the one or more processors to identify a set of classes within a monolithic application. A set of horizontal clusters are generated by performing horizontal clustering to the set of classes to decompose the classes based on a first functionality type. The computer program product generates a set of vertical clusters by performing vertical clustering to the set of classes to decompose the classes based on a second functionality type. A subset of classes occurring in a common horizontal cluster and vertical cluster are identified as a functional unit. The computer program product merges one or more functional units to form a microservice.

DETAILED DESCRIPTION

The present disclosure relates generally to methods for identifying and forming microservices. More particularly, but not exclusively, embodiments of the present disclosure relate to a computer-implemented method for decomposing monolithic applications to form microservices. The present disclosure relates further to a related system for identifying and forming microservices, and a computer program product for operating such a system.

Applications may be used by organizations for relatively long periods of time, even as other applications are adopted, changed, or retired. As applications are used over time, modernization may be considered to maintain usefulness of the application. Identifying microservices within an application may be part of the modernization and maintenance of the application. Some systems identify microservices without considering an architectural pattern of the application. Further, some systems do not consider relationships of classes in identifying microservices. Some systems consider relations between classes with respect to context windows, without consideration of logical functions of classes.

Embodiments of the present disclosure decompose monolithic applications into microservices. The monolithic applications may be decomposed using orthogonal clustering. Some embodiments of the present disclosure use horizontal clustering to decompose monolithic applications. Horizontal clustering may decompose classes based on functionalities, such as business functionalities. Some embodiments of the present disclosure use vertical clustering to decompose monolithic applications. Vertical clustering may decompose classes based on functionalities, such as logical functionalities. Some embodiments of the present disclosure use a combination of horizontal clustering and vertical clustering to decompose monolithic applications. Hierarchical clustering may be used to decompose application classes into different partitions. Clustering methods used in the present disclosure may use static code or runtime traces as input. Embodiments of the present disclosure identify classes into functional units and merge functional units into microservices. The functional units may be merged according to a set of rules, for example rules considering call invocations. Embodiments of the present disclosure enable identification of microservice candidates with suitable accuracy and maintainability including complexity, cohesion, and coupling. Further, embodiments of the present disclosure may enable groupings of classes to inform application modernization decisions.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
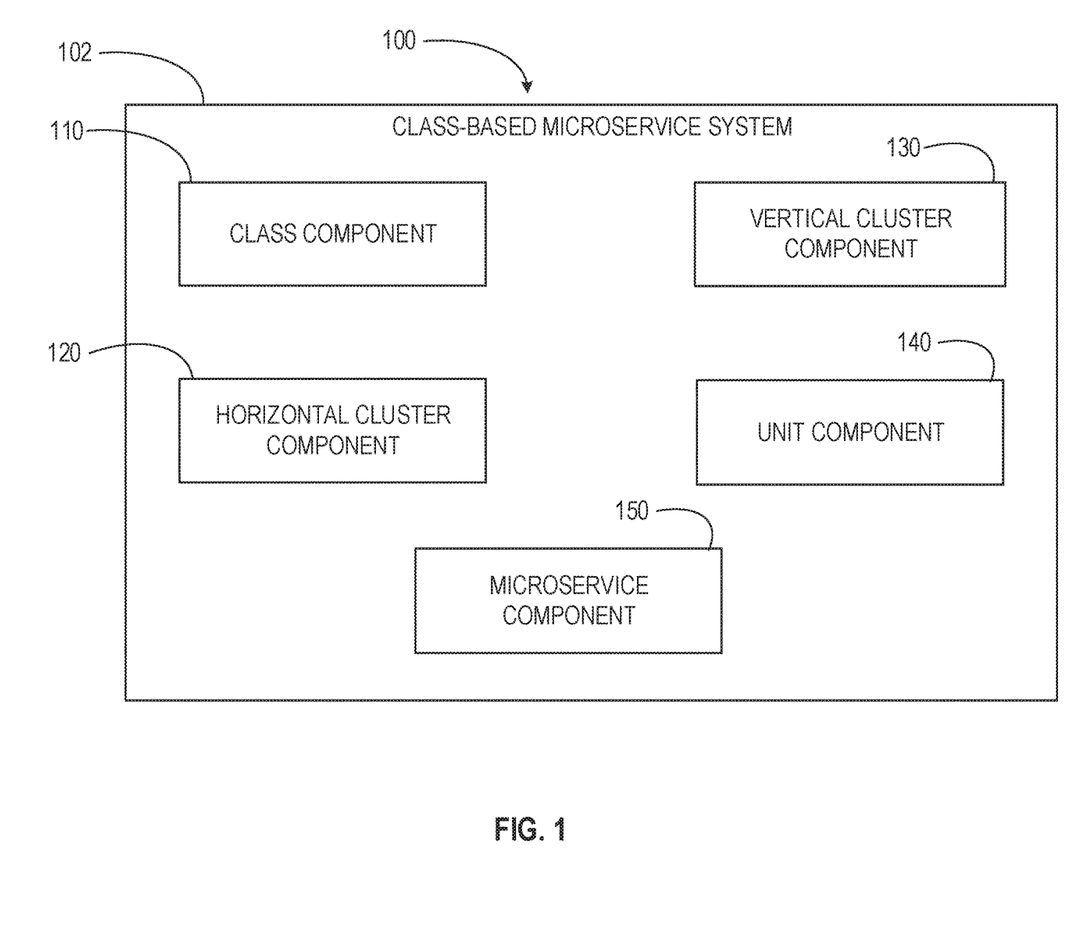
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a class-based microservice system 102. The class-based microservice system 102 may comprise a class component 110, a horizontal cluster component 120, a vertical cluster component 130, a unit component 140, and a microservice component 150. The class component 110 identifies classes within monolithic applications. The horizontal cluster component 120 generates horizontal clusters from sets of classes identified within monolithic applications. The vertical cluster component 130 generates vertical clusters from sets of classes identified within monolithic applications. The unit component 140 identifies classes occurring in common horizontal clusters and vertical clusters to identify functional units. The microservice component 150 merges functional units or classes within functional units into microservices. Although described with distinct components, it should be understood that, in at least some embodiments, components may be combined or divided, and/or additional components may be added without departing from the scope of the present disclosure.

Figure 2:
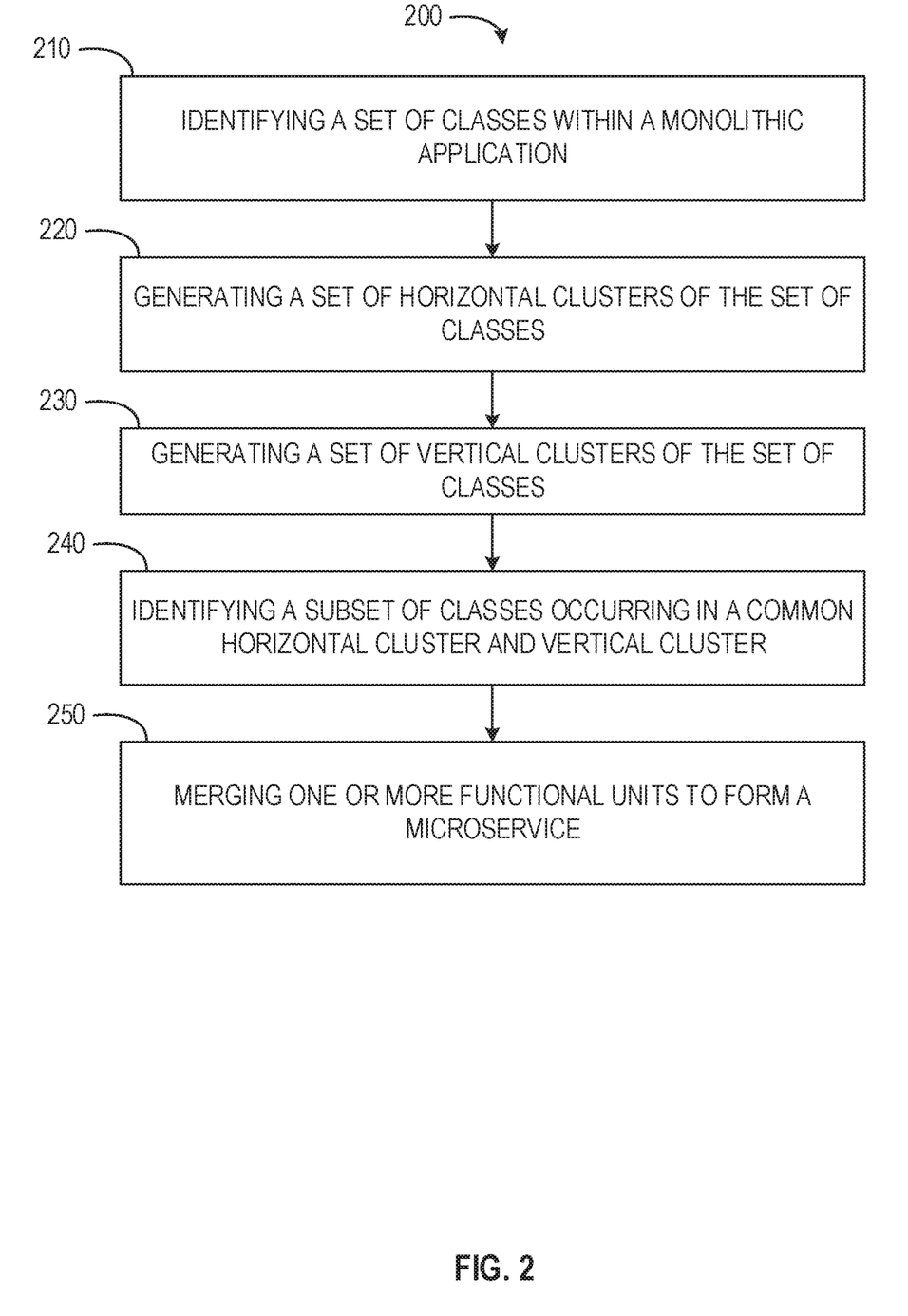
FIG. 2 depicts a flow diagram of a computer-implemented method for decomposing monolithic applications to form microservices, according to at least one embodiment.

Referring now to FIG. 2, a flow diagram of a computer-implemented method 200 is shown. The computer-implemented method 200 is a method for decomposing monolithic applications to form microservices. In some embodiments, the computer-implemented method 200 may be performed by one or more components of the computing environment 100, as described in more detail below.

At operation 210, the class component 110 identifies a set of classes within a monolithic application. In some embodiments, the class component 110 identifies the set of classes by examining source code of the monolithic application. The class component 110 may identify class names, attributes, characteristics, method names, method arguments, return types, class inputs, class outputs, class connections, combinations thereof, and any other suitable information from source code or associated application programming interface. In some embodiments, the class component 110 includes a python-based tool to insert code into the monolithic application. The inserted code may enable runtime trace generation. The class component 110 may also include a Java front-end tool. The front-end tool may enable generation of a trace based on a context of the class, such as a business context. In some embodiments, the class component 110 includes an extraction application. The extraction application may extract inheritance relationships, data dependency, attributes, method arguments, return types, combinations thereof, and other relationships among classes within the monolithic application.

In some embodiments, the class component 110 includes an architecture tool. The architecture tool analyzes an architecture pattern of the monolithic application. For example, the architecture tool may identify an n-tier architecture pattern within the monolithic application. The n-tier architecture pattern may include presentation, business logic, and data access layers. Each layer may define or represent a specific role that satisfies a particular business request. In some instances, the architecture tool may discern among classes, tables, and Java Server Pages (JSP) distributed among the layers of the architecture pattern within the monolithic application. The architecture tool may also determine complete paths of data, classes, or operations across layers of the architecture pattern. For example, the architecture tool may enable capture or identification of complete paths from the interface layer to the data access layer. These complete paths may be identified as causal paths. In some embodiments, the class component 110 the architecture tool identifies and considers direct calls and indirect calls to classes or methods to identify degrees of association between classes.

At operation 220, the horizontal cluster component 120 generates a set of horizontal clusters of the set of classes. The horizontal clustering may decompose the classes based on a first functionality type. The horizontal cluster component 120 may receive runtime traces with business context labels or symbol tables from static code as input. Runtime traces may be reduced to generate a unique call path and passed to the horizontal cluster component 120 as input to compute a similarity matrix based on direct call relations and indirect call relations. From the direct call relations and the indirect call relations, the horizontal cluster component 120 may generate the set of horizontal clusters by performing horizontal clustering on the set of classes.

At operation 230, the vertical cluster component 130 generates a set of vertical clusters of the set of classes. The vertical clustering may decompose the classes based on a second functionality type. The vertical cluster component 130 may receive runtime traces with business context labels or symbol tables from static code as input. Runtime traces may be reduced to generate a unique call path and passed to the vertical cluster component 130 as input to compute in-degree and out-degree of nodes. The in-degree and out-degree may be determined based on direct call relations and indirect call relations. The vertical cluster component 130 may compute a similarity matrix based on in-degree/out-degree ratio. The set of vertical clusters may then be generated by performing vertical clustering on the set of classes based on the similarity matrix.

At operation 240, the unit component 140 identifies a subset of classes occurring in a common horizontal cluster and vertical cluster. The subset of classes may be identified as a functional unit. Classes which have been clustered into the same horizontal cluster and vertical cluster are identified as occurring in a common horizontal cluster and vertical cluster and are identified as a functional unit. For example, classes occurring in a first horizontal cluster and a first vertical cluster may be considered as occurring in a same or common horizontal cluster and vertical cluster. By way of further example, the first horizontal cluster and the first vertical cluster may be understood as intersecting clusters.

In some embodiments, the unit component 140 merges classes into functional units based on relations of the classes determined by the horizontal clustering and vertical clustering. For example, where a class is called by other classes belonging to a same functional unit, the class may be merged with the functional unit and the other classes. The decomposition may decompose legacy monolithic applications into functional units. Classes belonging to the same functional units serve similar business use cases and share similar logical responsibilities.

In some instances, the set of classes of the monolithic application may be divided according to orthogonal views, such as a grid providing horizontal and vertical layers with the classes of the monolithic application distributed among the horizontal and vertical layers. Horizontal clusters may be identified as horizontal layers within the orthogonal views. Vertical clusters may be identified as vertical layers within the orthogonal views. Where a horizontal cluster and a vertical cluster intersect, classes within the intersection may be considered to be classes occurring in a common or same horizontal cluster and vertical cluster. In some instances, for each horizontal cluster, vertical layers may be merged where there is a backward function call.

At operation 250, the microservice component 150 merges one or more functional units to form a microservice. The microservice component 150 may merge functional units which are related above a relationship threshold. The microservice component 150 may merge functional units which have dependencies existing between classes contained in two or more different functional units. In some instances, the microservice component 150 analyzes functional units called by multiple other units. The microservice component 150 may determine relationships between a first functional unit which is called by a second functional unit and a third functional unit. The microservice component 150 may determine whether the relationship extends between the second functional unit and the third functional unit.

In some embodiments, the one or more functional units are merged to form a microservice based on one or more call invocations. In some embodiments, operations 230, 240, and 250 act as a set of rules to split or merge functional units according to patterns of invocation. The patterns of invocations may be identified from the one or more call invocations of the classes, the horizontal clusters, and the vertical clusters. The set of rules may ensure the merged functional units or microservices are maintainable based on complexity, cohesion, and coupling.

In some embodiments, the set of rules include merging functional units within each horizontal cluster to merge vertical layers if a reverse function call is detected by rules of an n-tier application. The set of rules may also include merging functional units if a class is called by other classes that belong to the same functional unit. Where such an instance occurs, a class is merged into the functional unit of the other classes to reduce coupling between functional units. The rules may also include merging functional units that are bi-directionally dependent on each other. Such merging may reduce coupling.

In some embodiments, the microservice component 150 presents the microservices (e.g., the orthogonal clustering results) in a graphical user interface. The graphical user interface may present the microservices, functional units within microservices, and classes clustered and merged into functional units. The graphical user interface may present the microservices, functional units, and classes within an expandable presentation, such as a graph. In some embodiments, the graphical user interface may present information in a nested or cascading format, such that selection of a microservice may expand into a presentation of one or more functional units within the selected microservice. Similarly, selection of a functional unit may expand into a presentation of a set of classes clustered and merged into a selected functional unit. In some instances, the graphical user interface may present the microservices, functional units, and classes in a searchable format, enabling exploration of the above-referenced information with varying levels of granularity.

In some instances, the graphical user interface presents the microservices in a selectable manner, such that a user may explore the microservices and the functional units and classes making up those microservices. The graphical user interface may present both vertical and horizontal clustering results. In such instances, users may interact with the graphical user interface to select between views of horizontal clusters (e.g., horizontal views) and vertical clusters (e.g., vertical views).

Figure 3:
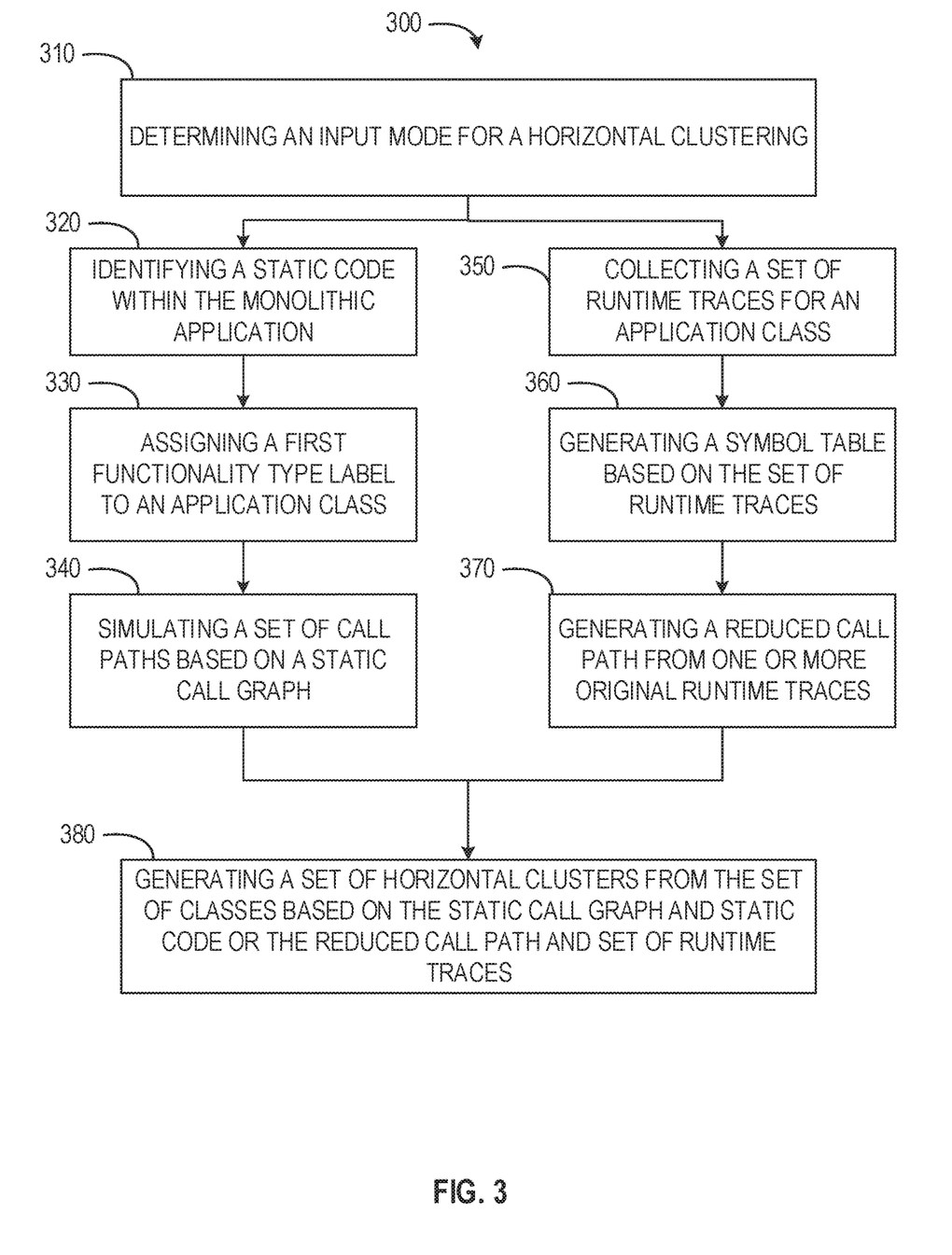
FIG. 3 depicts a flow diagram of a computer-implemented method for decomposing monolithic applications to form microservices, according to at least one embodiment.

FIG. 3 shows a flow diagram of an embodiment of a computer-implemented method 300 for decomposing monolithic applications to form microservices. The method 300 may be performed by or within the computing environment 100. In some embodiments, the method 300 comprises or incorporates one or more operations of the method 200. In some instances, operations of the method 300 may be incorporated as part of or sub-operations of the method 200, such as operation 220.

In operation 310, the horizontal cluster component 120 determines an input mode for the horizontal clustering. The input mode may represent an input available for the horizontal cluster component 120 to generate clusters of classes. In some instances, input modes include static code and runtime traces. Static code may be source code of the monolithic application. Runtime traces capture execution events within the monolithic application, when the monolithic application is executed with specified or available input. The horizontal cluster component 120 may determine the input mode based on selection of a user within a graphical user interface. In some embodiments, the horizontal cluster component 120 determines the input mode based on accessibility of inputs for each input mode. For example, the horizontal cluster component 120 may determine if source code is available for the monolithic application, and select the static code input where the source code is available. In some instances, the horizontal cluster component 120 may determine the input mode based on a type of application or characteristics for the monolithic application.

In operation 320, where the horizontal cluster component 120 determines an input mode of a static code, the horizontal cluster component 120 identifies static code within the monolithic application (e.g., source code). In some instances, the horizontal cluster component 120 identifies source code relating to classes within the monolithic application. In some instances the horizontal cluster component 120 determines classes based on an API associated with the monolithic application.

In operation 330, the horizontal cluster component 120 assigns a first functionality type label to an application class. The horizontal cluster component 120 may assign the first functionality type label based on an information retrieval technique. The horizontal cluster component 120 may assign the first functionality type label based on a static analysis. The horizontal cluster component 120 may assign the first functionality type label based on the information retrieval technique and the static analysis. The information retrieval technique and the static analysis may be associated with the application class. The functionality type label may be a business context label, in some instances.

In operation 340, the horizontal cluster component 120 simulates a set of call paths based on a static call graph. The static call graph may be a control flow graph representing calling relationships between classes. Each call path may be associated with a set of business use case labels. The horizontal cluster component 120 may simulate the set of call paths by static analysis.

In operation 350, where the horizontal cluster component 120 determines an input mode of a runtime trace, the horizontal cluster component 120 collects a set of runtime traces for an application class. The set of runtime traces may be produced by running one or more test cases of the first functionality type. In some instances, the runtime traces are produced by running business functional test cases. The runtime traces may include a business context label indicating the business functional test case of the runtime trace. The runtime traces are collected as they run.

In operation 360, the horizontal cluster component 120 generates a symbol table based on the set of runtime traces for the application class. The symbol table may be a data structure having identifies associated with information relating to a declaration or appearance of classes within the monolithic application. In some embodiments, the symbol table is generated from the collected runtime traces based on a static code base of the monolithic application. The symbol table may be generated on demand for the clustering process by the horizontal cluster component 120 or another component of the class-based microservice system 102.

In operation 370, the horizontal cluster component 120 generates a reduced call path from one or more original runtime traces. The reduced call path may be a reduced runtime path generated from original runtime traces. In some embodiments, the horizontal cluster component 120 generates the set of horizontal clusters by performing horizontal clustering on the reduced runtime path. The horizontal clustering may result in formation of groups of classes with coherent business functionalities. In some instances, the reduced call path is generated from the original runtime traces and the symbol table. The reduced call path may be reduced to generate a unique call path from the runtime trace.

The reduced call path may be a runtime path generation reduced by removing loops, removing returns, and separating forks. For example, where runtime paths are encountered including "t1, bcl, Root call A," "t2, bcl, A call B," "t3, bcl, B call C," "t4, bcl, C returns B," "t5, bcl, B returns A," and "t6, bcl, A returns Root," a runtime path may be reduced to a path of "Root →A→B→C." By way of further example, where runtime paths are encountered including "t1, bcl, Root call A," "t2, bcl, A call B," "t3, bcl B call C," "t4, bcl, C returns B," "t5, bcl B call E," "t6, bcl, E returns B," "t7, bcl, B returns A," and "t8, bcl, A returns Root," a runtime path may be reduced to two paths of: Path 1: "Root→A→B→C" and Path 2: "Root→A→B→E." The horizontal cluster component 120 may then call a stack push on one of the reduced paths and return a stack pop for the reduced path.

In operation 380, the horizontal cluster component 120 generates the set of horizontal clusters. The horizontal cluster component 120 may generate the set of horizontal clusters from the set of classes based on the input of static code and operations 320-340 or based on the input of the runtime trace and operations 350-370. In some embodiments, the horizontal cluster component 120 generates the set of horizontal clusters by calculating a similarity matrix of pairs of classes. The pairs of classes used for the similarity matrix may be pairs of classes based on direct call relations and/or indirect call relations. The horizontal cluster component 120 may apply a hierarchical clustering algorithm to generate one or more partitions for the horizontal clusters. The hierarchical clustering algorithm may group similar objects into clusters based on the similarity matrix. The hierarchical clustering algorithm may merge classes belonging to a same business use case. The merged classes may be initial clusters. In some instances, the horizontal cluster component 120 forms the horizontal clusters by repeatedly or iteratively calculating the similarity between pairs of initial clusters and merging pairs of clusters which are most similar.

To calculate similarity scores for a pair of initial clusters, the horizontal cluster component may employ Equation 1.

$$Sim_{i,j} \frac{\sum_{m=0}^{n_i} \sum_{n=0}^{n_j} S(c_{im}, c_{jn})}{|C_i||C_j|} \quad \text{Equation 1}$$

In Equation 1, $S(c_{im}, c_{jn})$ is a similarity score of two classes $c_{im}$ and $c_{jn}$. "i" and "j" may represent clusters. The classes $c_{im}$ and $c_{jn}$ may belong to cluster i and cluster j, respectively. $|C_i|$ and $|C_j|$ may represent a size of cluster i and cluster j, respectively.

In some embodiments, the similarity score of a pair of classes can be calculated based on relations between the classes. The relations may include direct call relations, indirect call relations, direct call relations patterns, and indirect call relations patterns. Direct call relations (DCR) may represent whether a call relation exists between two classes. Indirect call relations (ICR) may represent whether two classes appear in a same reduced runtime path. Direct call relations patterns (DCRP) represents whether classes have similar call relations with other classes. Indirect call relations patterns (ICRP) represents whether classes have similar co-occur relations with other classes. The similarity score between classes $c_i$ and $c_j$ may be calculated based on the four relations using Equation 2.

$$S(c_i,c_j)=DCR_{ij}+ICR_{ij}+DCRP_{ij}+ICRP_{ij} \quad \text{Equation 2}$$

In some embodiments, a direct call relation is measured as a ratio of a number of business use cases where there is a call relation between classes $c_i$ and $c_j$ to a number of business use cases associated with two classes. The DCR may be measured using Equation 3.

$$CR_{ij} = CR_{ij} = \frac{|B_{ci \leftrightarrow cj}|}{|B_i| \cup |B_j|} \quad \text{Equation 3}$$

$|B_{ci \leftrightarrow cj}|$ represents a number of business use cases where $c_i$ calls a function which belongs to $c_j$ or $c_j$ calls a function belonging to $c_i$. The denominator of Equation 3 represents a total number of business use cases with which classes $c_i$ and $c_j$ are associated. In some instances, if $c_i$ participates in two business use cases $\{B_1, B_2\}$, $c_j$ participates in three business use cases $\{B_1, B_2, B_3\}$, and there is a function call from $c_i$ to $c_j$ associated with $B_1$, Equation 3 may determine the direct call relation for $c_i$ and $c_j$ as $$\text{Call\_Relation}_{i,j} = \frac{1}{2+3}.$$

In some embodiments, ICR co-occur relations are calculated as a ratio of a number of business use cases associated with a reduced runtime path where classes $c_i$ and $c_j$ co-occur to a number of business use cases associated with the two classes $c_i$ and $c_j$. The ICR may be measured using Equation 4.

$$CoR_{ij} = \frac{|B_{ci \leftrightarrow cj}|}{|B_i| \cup |B_j|} \quad \text{Equation 4}$$

In Equation 4, $|B_{ci \leftrightarrow cj}|$ represents a number of business context uses associated with the reduced runtime paths where classes $c_i$ and $c_j$ co-occur.

In some embodiments, DCRP represents how similarly two classes interact with other classes. The similarity may be based on function calls. The DCRP may be calculated using Equation 5.

$$CRP_{ij} = \frac{\sum_{c_k \in C, c_k \neq \{c_i, c_j\}} |B_{ci \leftrightarrow ck} \cap B_{cj \leftrightarrow ck}|}{(|C| - 2) \times (|B|)} \quad \text{Equation 5}$$

For example, tables 1 and 2 may depict an interaction pattern of classes $c_1$ and $c_2$ with other classes.

TABLE 1

| $c_1$ | $BC_1$ | $BC_2$ | $BC_3$ |
|---|---|---|---|
| $c_3$ | 1 | 1 | 0 |
| $c_4$ | 0 | 0 | 0 |
| $c_5$ | 1 | 0 | 0 |

TABLE 2

| $c_2$ | $BC_1$ | $BC_2$ | $BC_3$ |
|---|---|---|---|
| $c_3$ | 1 | 0 | 0 |
| $c_4$ | 0 | 1 | 0 |
| $c_5$ | 1 | 1 | 0 |

Tables 1 and 2 depict whether classes $c_1$ and $c_2$ have a call relation with other classes $c_3$, $c_4$, and $c_5$. Classes $c_1$ and $c_2$ may have a direct edge with $c_3$ and $c_5$ in a business use case $BC_1$. In such an instances, Equation 5 may provide values such that $$CRP_{ij} = \frac{2}{(3 \times 3)}.$$

In some embodiments, ICRP may be calculated in a manner similar to or the same as the manner for calculating DCRP.

Figure 4:
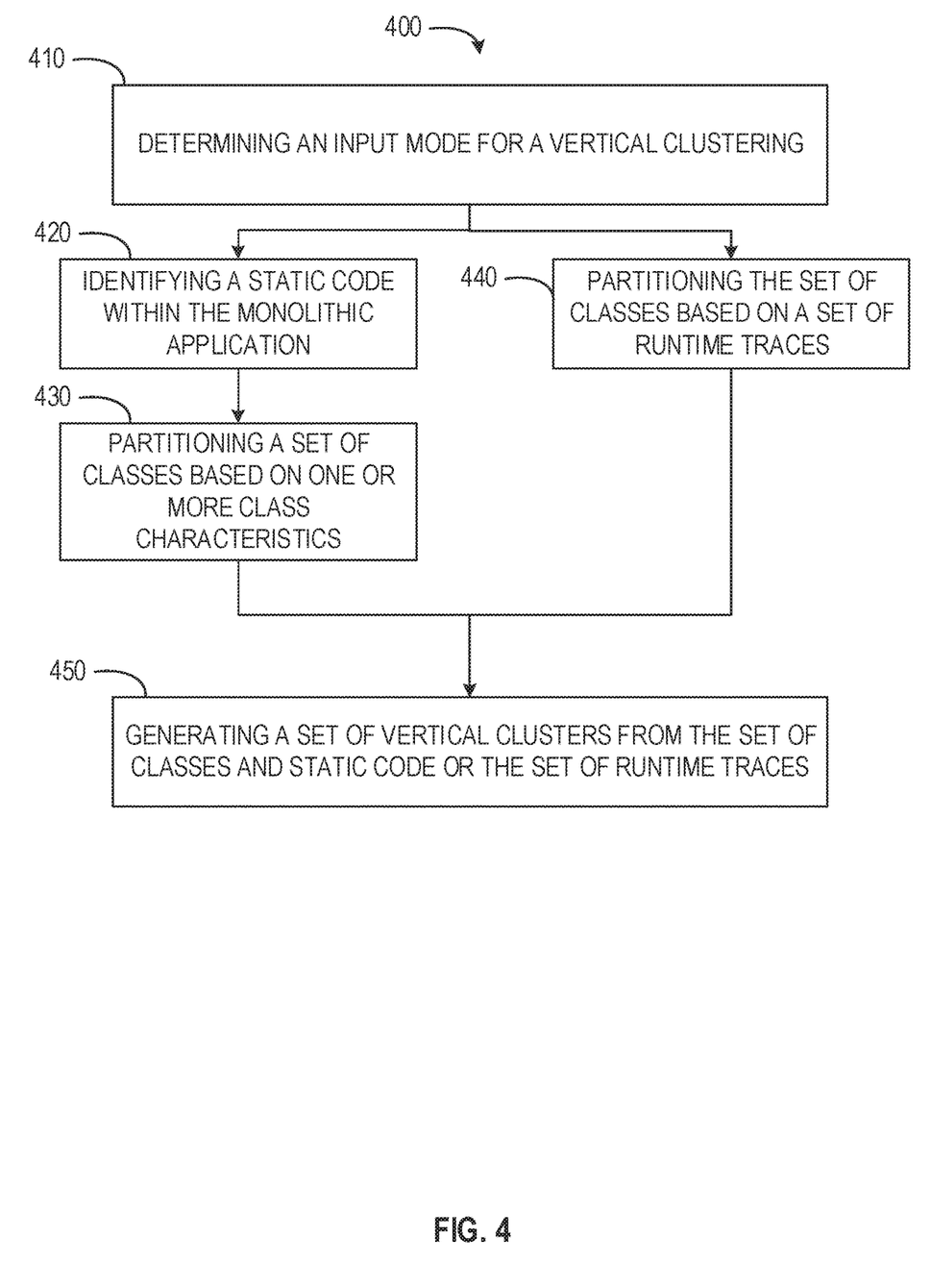
FIG. 4 depicts a flow diagram of a computer-implemented method for decomposing monolithic applications to form microservices, according to at least one embodiment.

FIG. 4 shows a flow diagram of an embodiment of a computer-implemented method 400 for decomposing monolithic applications to form microservices. The method 400 may be performed by or within the computing environment 100. In some embodiments, the method 400 comprises or incorporates one or more operations of the method 200. In some instances, operations of the method 400 may be incorporated as part of or sub-operations of the method 200, such as operation 230.

In operation 410, the vertical cluster component 130 determines an input mode for the vertical clustering. The input mode may be in the form of direct call relations and indirect call relations. In some embodiments, the vertical cluster component 130 may determine the input mode in a manner similar to or the same as described above with respect to operation 310. After determining an input mode of static code or runtime traces, the vertical cluster component 130 may determine the relations of the classes. The vertical cluster component 130 may determine direct call relations and indirect call relations for each class within the monolithic application.

In operation 420, where the vertical cluster component 130 determines an input mode of static code, the vertical cluster component 130 identifies static code within the monolithic application. The vertical cluster component 130 may identify the static code in a manner similar to or the same as described above with respect to operation 320. The vertical cluster component 130 may also determine the direct and indirect call relations for the classes from the static code based on the source code of the monolithic application or an API associated with the monolithic application.

In operation 430, the vertical cluster component 130 partitions the set of classes based on one or more class characteristics. The class characteristics may include one or more of a class name, a package structure, a source directory structure, and a development team allocation. The class characteristics may be determined based on the source code or the API associated with the monolithic application. In some instances, the vertical cluster component 130 partitions the set of classes using a vertical clustering algorithm.

In operation 440, where the vertical cluster component 130 determines an input mode of runtime traces, the vertical cluster component 130 partitions the set of classes. The set of classes may be partitioned based on one or more of an in-degree and an out-degree relative to a set of runtime traces. In some embodiments, the vertical cluster component 130 calculates in-degree and out-degree values of each class based on direct call relations and indirect call relations for those classes. The vertical cluster component 130 may calculate an in-degree/out-degree ratio for each class. Based on the in-degree/out-degree ratio, the vertical cluster component 130 generates a similarity matrix based on a difference in the in-degree/out-degree ratio for each class. The vertical cluster component 130 may then apply a hierarchical clustering algorithm to generate partitions among the classes.

The vertical cluster component 130 may calculate the similarity matrix between pairs of classes. In some embodiments, the vertical cluster component 130 generates an in-degree and an out-degree value for each class from the reduced runtime path. The vertical cluster component 130 may consider relations between the classes. In a manner similar to that described above with respect to the horizontal cluster component 120, the vertical cluster component 130 may consider two types of relation, a call relation and a co-occur relation. The vertical cluster component 130 may increment in-degree and out-degree by one where there is a call relation between a source class and a target class (e.g., two classes of a pair). The vertical cluster component 130 may increment the in-degree and out-degree by $$\frac{1}{dis_{ij}}$$

when there is a co-occur relation. In some embodiments, the vertical cluster component 130 then calculates an in-degree/out-degree ratio as $$\frac{\text{in-degree}}{\text{in-degree} + \text{out-degree}}.$$

In such instances, the similarity score between the two classes $c_i$ and $c_j$ may be calculated as $$1 - \text{abs}\left(\frac{i}{o_i} - \frac{i}{o_j}\right),$$

where abs(•) calculates an absolute value.

In operation 450, the vertical cluster component 140 generates the set of vertical clusters. The vertical cluster component 130 may generate the set of vertical clusters from the set of classes based on the input of static code and operations 420-430 or based on the input of the runtime trace and operation 440. The vertical clusters may be generated in a single set of operations or iteratively. Where the vertical clusters are generated iteratively, the vertical cluster component 140 may generate an initial set of vertical clusters and subsequent sets of vertical clusters based on the initial set of vertical clusters and one or more subsequent operations to refine the initial set of vertical clusters.

Figure 5:
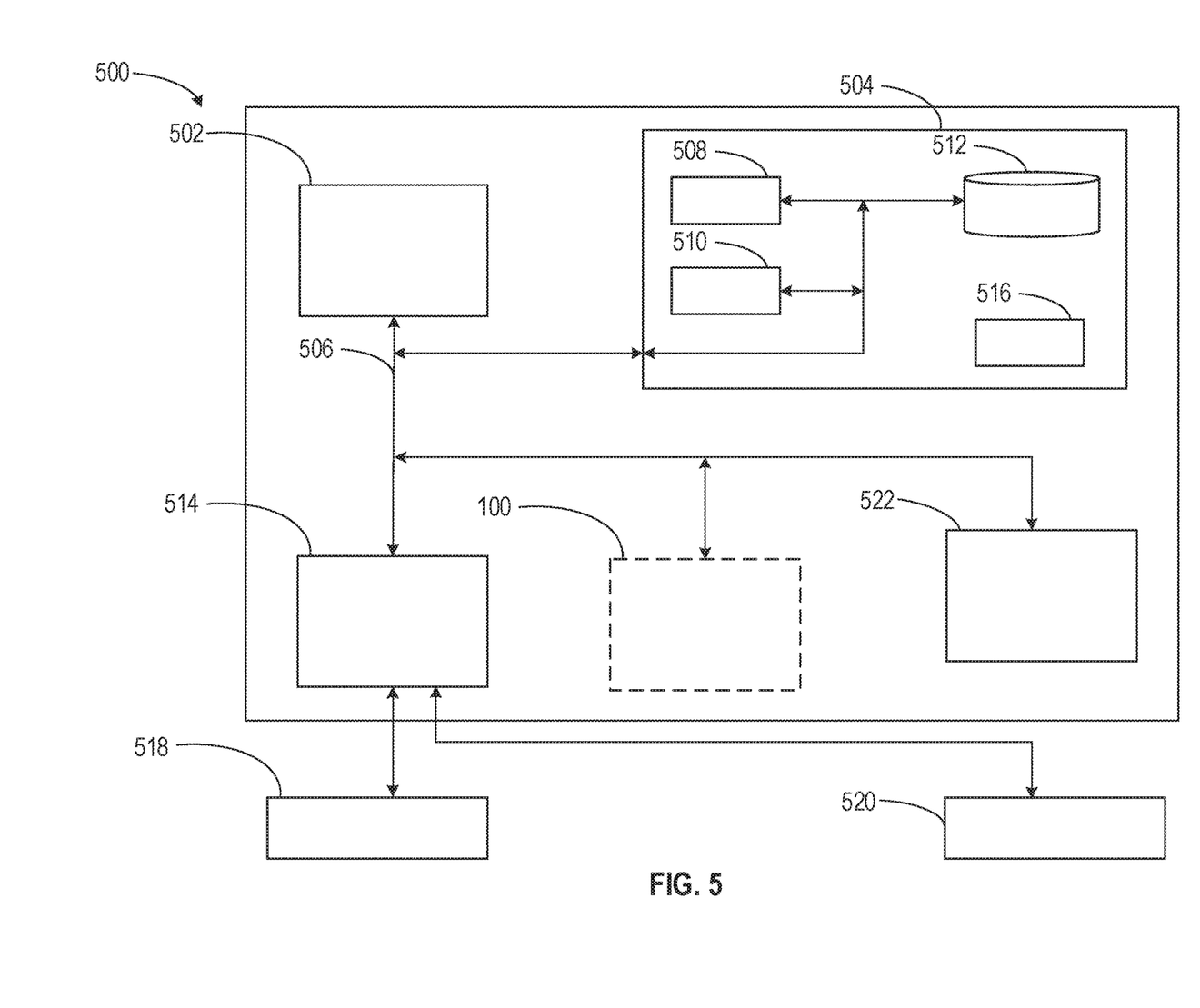
FIG. 5 depicts a block diagram of a computing system for decomposing monolithic applications to form microservices, according to at least one embodiment.

Embodiments of the present disclosure may be implemented together with virtually any type of computer, regardless of the platform is suitable for storing and/or executing program code. FIG. 5 shows, as an example, a computing system 500 (e.g., cloud computing system) suitable for executing program code related to the methods disclosed herein and for decomposing monolithic applications to form microservices.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the class component 110, the horizontal cluster component 120, the vertical cluster component 130, the unit component 140, and the microservice component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
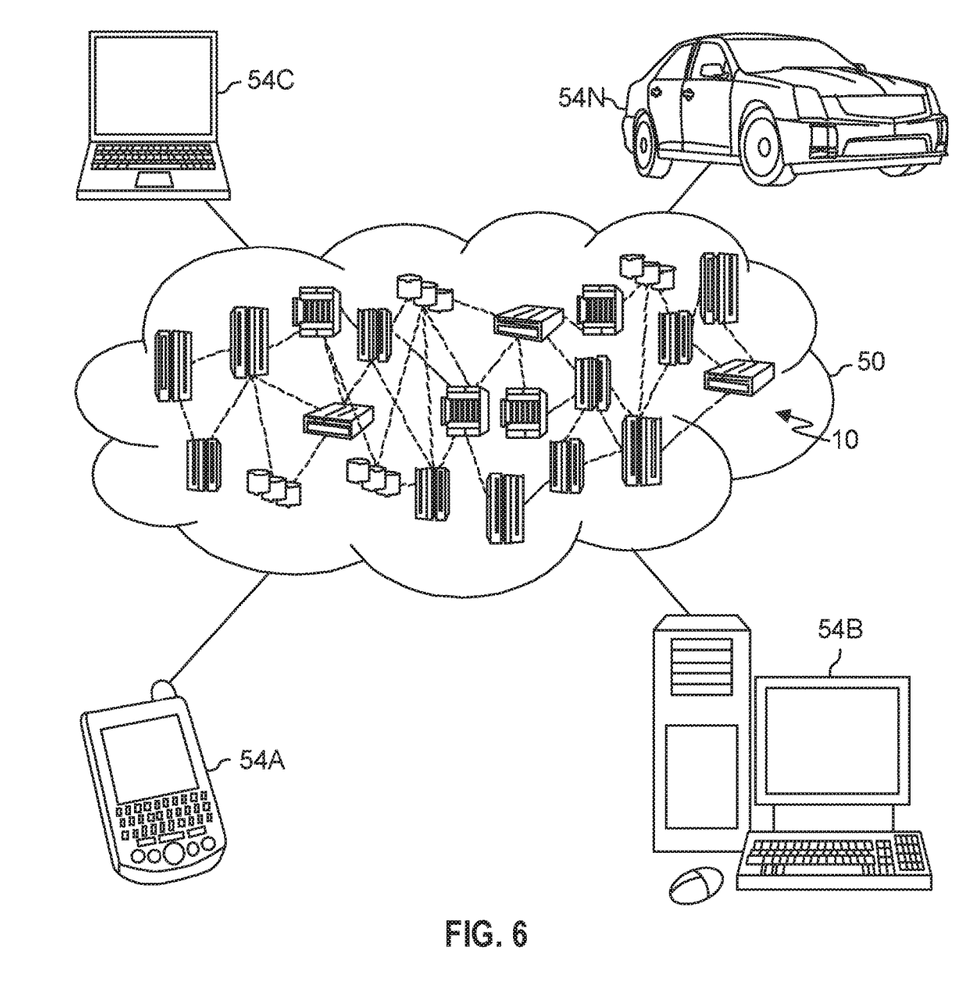
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
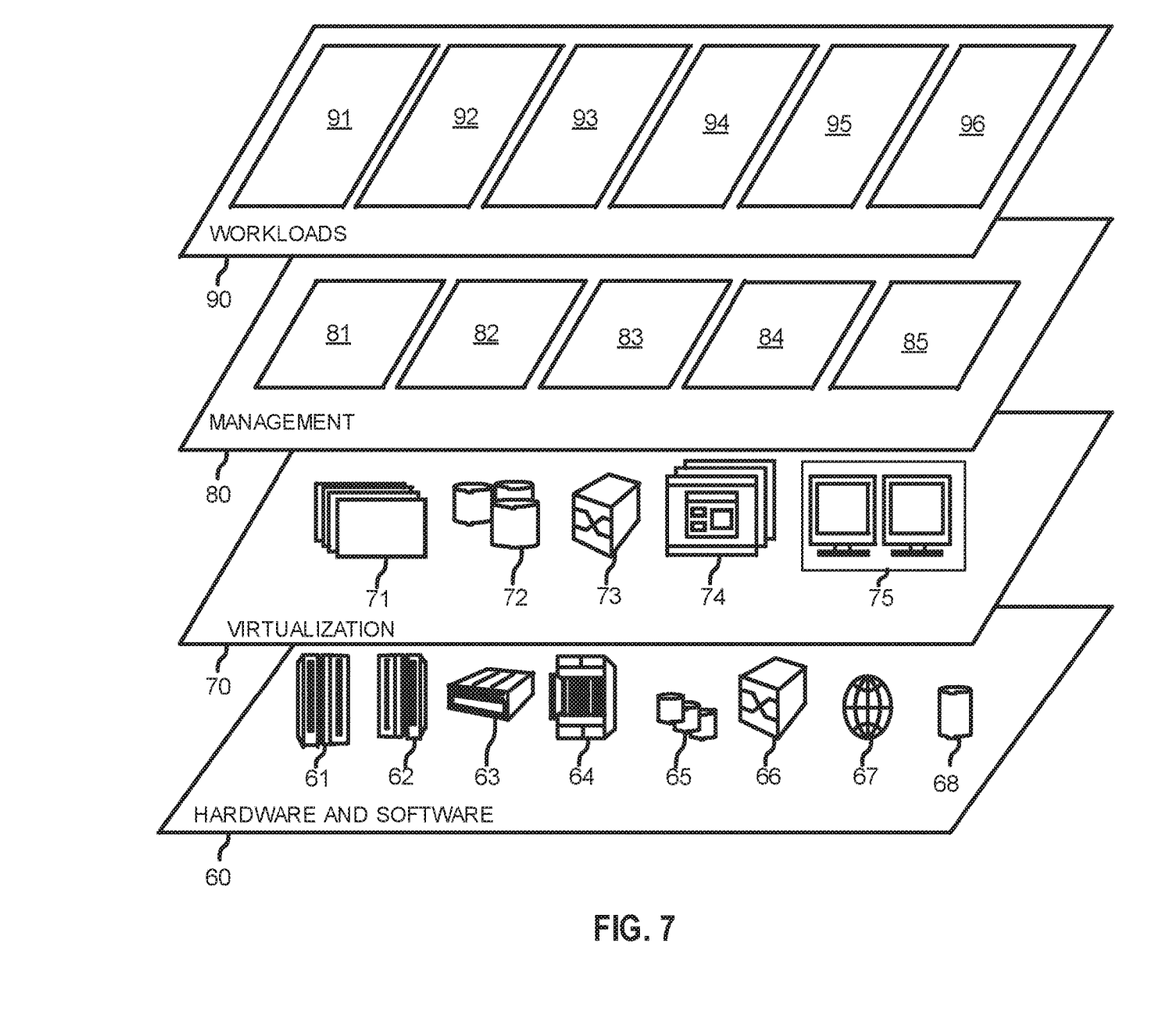
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice identification processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary

What is claimed is:

1. A computer-implemented method, comprising:
    identifying a set of classes within a monolithic application;
    generating a set of horizontal clusters by performing horizontal clustering to the set of classes to decompose the classes based on a first functionality type;
    generating a set of vertical clusters by performing vertical clustering to the set of classes to decompose the classes based on a second functionality type and partitioning the set of classes based on one or more of an in-degree and an out-degree relative to a set of runtime traces;
    identifying a subset of classes occurring in a common horizontal cluster and vertical cluster as a functional unit; and merging one or more functional units to form a microservice.

2. The method of claim 1, wherein performing horizontal clustering further comprises:
identifying static code within the monolithic application;
assigning a first functionality type label to an application class based on one or more of an information retrieval technique and a static analysis associated with the application class; and
simulating a set of call paths based on a static call graph.

3. The method of claim 1, wherein performing horizontal clustering further comprises:
collecting a set of runtime traces for an application class, the set of runtime traces produced by running one or more test cases of the first functionality type;
generating a symbol table based on the set of runtime traces for the application class; and
generating a reduced call path from one or more original runtime traces.

4. The method of claim 1, wherein performing vertical clustering further comprises:
identifying static code within the monolithic application; and
partitioning the set of classes based on one or more class characteristics.

5. The method of claim 4, wherein the one or more class characteristics include one or more of a class name, a package structure, a source directory structure, and a development team allocation.

6. The method of claim 1, wherein the one or more functional units are merged to form a microservice based on one or more call invocations.

7. A system, comprising:
one or more processors; and
a non-transitory computer-readable storage medium, coupled to the one or more processors, storing program instructions that, when executed by the one or more processors, cause the one or more processors to perform operations comprising:
identifying a set of classes within a monolithic application; generating a set of horizontal clusters by performing horizontal clustering to the set of classes to decompose the classes based on a first functionality type;
generating a set of vertical clusters by performing vertical clustering to the set of classes to decompose the classes based on a second functionality type and
partitioning the set of classes based on one or more of an in-degree and an out-degree relative to a set of runtime traces;
identifying a subset of classes occurring in a common horizontal cluster and vertical cluster as a functional unit; and
merging one or more functional units to form a microservice.

8. The system of claim 7, wherein performing horizontal clustering further comprises:
identifying static code within the monolithic application;
assigning a first functionality type label to an application class based on one or more of an information retrieval technique and a static analysis associated with the application class; and
simulating a set of call paths based on a static call graph.

9. The system of claim 7, wherein performing horizontal clustering further comprises:
collecting a set of runtime traces for an application class, the set of runtime traces produced by running one or more test cases of the first functionality type;
generating a symbol table based on the set of runtime traces for the application class; and
generating a reduced call path from one or more original runtime traces.

10. The system of claim 7, wherein performing vertical clustering further comprises:
identifying static code within the monolithic application; and
partitioning the set of classes based on one or more class characteristics.

11. The system of claim 10, wherein the one or more class characteristics include one or more of a class name, a package structure, a source directory structure, and a development team allocation.

12. The system of claim 7, wherein the one or more functional units are merged to form a microservice based on one or more call invocations.

13. A computer program product comprising a non-transitory computer readable storage medium having program instructions embodied therewith, the program instructions being executable by one or more processors to cause the one or more processors to perform operations comprising:
identifying a set of classes within a monolithic application;
generating a set of horizontal clusters by performing horizontal clustering to the set of classes to decompose the classes based on a first functionality generating a set of vertical clusters by performing vertical clustering to the set of classes to decompose the classes based on a second functionality type and
partitioning the set of classes based on one or more of an in-degree and an out-degree relative to a set of runtime traces;
identifying a subset of classes occurring in a common horizontal cluster and vertical cluster as a functional unit; and merging one or more functional units to form a microservice.

14. The computer program product of claim 13, wherein performing horizontal clustering further comprises:
identifying static code within the monolithic application;
assigning a first functionality type label to an application class based on one or more of an information retrieval technique and a static analysis associated with the application class; and
simulating a set of call paths based on a static call graph.

15. The computer program product of claim 13, wherein performing horizontal clustering further comprises:
collecting a set of runtime traces for an application class, the set of runtime traces produced by running one or more test cases of the first functionality type;
generating a symbol table based on the set of runtime traces for the application class; and
generating a reduced call path from one or more original runtime traces.

16. The computer program product of claim 13, wherein performing vertical clustering further comprises:
identifying static code within the monolithic application; and
partitioning the set of classes based on one or more class characteristics, the one or more class characteristics include one or more of a class name, a package structure, a source directory structure, and a development team allocation.

17. The computer program product of claim 13, wherein the one or more functional units are merged to form a microservice based on one or more call invocations.

* * * * *